US008837950B2

(12) United States Patent
Hosking

(10) Patent No.: US 8,837,950 B2
(45) Date of Patent: Sep. 16, 2014

(54) ACCESSING TRANSCEIVER LINK INFORMATION FROM HOST INTERFACE

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 1411 days.

(21) Appl. No.: 12/200,398

(22) Filed: Aug. 28, 2008

(65) Prior Publication Data
US 2010/0054733 A1 Mar. 4, 2010

(51) Int. Cl.
*H04B 10/02* (2006.01)
*H04B 10/40* (2013.01)
*H04B 10/077* (2013.01)
*H04B 10/00* (2013.01)

(52) U.S. Cl.
CPC ............ *H04B 10/0779* (2013.01); *H04B 10/40* (2013.01)
USPC ............................. 398/135; 398/30; 398/181

(58) Field of Classification Search
USPC ................ 399/30, 135–139, 181; 398/30, 398/135–139, 181
See application file for complete search history.

(56) References Cited

U.S. PATENT DOCUMENTS

| 5,812,572 | A | 9/1998 | King et al. |
|---|---|---|---|
| 6,141,125 | A | 10/2000 | Blair et al. |
| 6,692,132 | B1 | 2/2004 | Meeker |
| 6,975,395 | B1 | 12/2005 | Gentieu et al. |
| 7,072,587 | B2 | 7/2006 | Dietz et al. |
| 7,215,891 | B1 | 5/2007 | Chiang et al. |
| 7,268,688 | B2 | 9/2007 | Juds |
| 7,286,736 | B2 | 10/2007 | Rosenberg |
| 7,320,551 | B1 | 1/2008 | Moore et al. |
| 7,426,348 | B2 | 9/2008 | Mahowald et al. |
| 7,507,111 | B2 | 3/2009 | Togami et al. |
| 7,532,820 | B2 | 5/2009 | Aronson |
| 7,721,012 | B2 | 5/2010 | Le et al. |
| 7,757,936 | B2 | 7/2010 | Aguren et al. |
| 2002/0149821 | A1 | 10/2002 | Aronson et al. |
| 2003/0020986 | A1 | 1/2003 | Pang et al. |
| 2003/0053170 | A1 | 3/2003 | Levinson et al. |
| 2003/0057984 | A1 | 3/2003 | Akram |
| 2003/0163508 | A1 | 8/2003 | Goodman |
| 2003/0231839 | A1 | 12/2003 | Chen et al. |
| 2004/0071471 | A1 | 4/2004 | Baker et al. |
| 2004/0213286 | A1 | 10/2004 | Jette et al. |
| 2005/0032415 | A1 | 2/2005 | Sakamoto |
| 2005/0079831 | A1* | 4/2005 | Ramachandran ............ 455/90.3 |
| 2005/0105915 | A1 | 5/2005 | Light |
| 2005/0196111 | A1 | 9/2005 | Burdick et al. |
| 2005/0196322 | A1 | 9/2005 | Truex |
| 2005/0232643 | A1* | 10/2005 | Aronson et al. ............. 398/183 |

(Continued)

OTHER PUBLICATIONS

U.S. Appl. No. 12/184,042, May 3, 2011, Office Action.

(Continued)

*Primary Examiner* — Daniel Dobson
(74) *Attorney, Agent, or Firm* — Maschoff Brennan

(57) ABSTRACT

Embodiments of the present invention include systems and methods for accessing the digital diagnostic data and controller data of a remote transceiver module via the diagnostic port of a local transceiver. The invention involves modulating high-speed data and out-of-band data as a double modulated signal, wherein the out-of-band data includes the remote transceiver controller and digital diagnostic data, which is subsequently accessible by an external user device from the diagnostic port of the local transceiver.

20 Claims, 18 Drawing Sheets

(56) References Cited

U.S. PATENT DOCUMENTS

| | | |
|---|---|---|
| 2005/0238305 A1 | 10/2005 | Miller et al. |
| 2006/0062116 A1 | 3/2006 | Ishibashi |
| 2006/0189220 A1 | 8/2006 | Duval et al. |
| 2007/0058980 A1 | 3/2007 | Hidaka |
| 2007/0058987 A1 | 3/2007 | Suzuki |
| 2007/0092257 A1* | 4/2007 | Smith et al. .................. 398/135 |
| 2007/0291491 A1 | 12/2007 | Li et al. |
| 2009/0261955 A1 | 10/2009 | Moore et al. |
| 2010/0027991 A1 | 2/2010 | Hosking |
| 2010/0028014 A1 | 2/2010 | Hosking |
| 2010/0028015 A1 | 2/2010 | Hosking |
| 2010/0054734 A1 | 3/2010 | Hosking |
| 2010/0054749 A1 | 3/2010 | Hosking |

OTHER PUBLICATIONS

U.S. Appl. No. 12/184,042, Aug. 22, 2011, Office Action.
U.S. Appl. No. 12/184,042, Jan. 19, 2012, Notice of Allowance.
U.S. Appl. No. 12/184,101, May 3, 2011, Office Action.
U.S. Appl. No. 12/184,101, Mar. 14, 2012, Office Action.
U.S. Appl. No. 12/184,101, Apr. 16, 2012, Notice of Allowance.
U.S. Appl. No. 12/200,406, Jun. 29, 2011, Office Action.
U.S. Appl. No. 12/200,406, Dec. 1, 2011, Office Action.
U.S. Appl. No. 12/184,093, Apr. 19, 2011, Office Action.
U.S. Appl. No. 12/184,093, Sep. 13, 2011, Office Action.
U.S. Appl. No. 12/184,093, Nov. 3, 2011, Notice of Allowance.
U.S. Appl. No. 12/200,337, Aug. 5, 2011, Office Action.
U.S. Appl. No. 12/200,337, Mar. 15, 2012, Office Action.

* cited by examiner

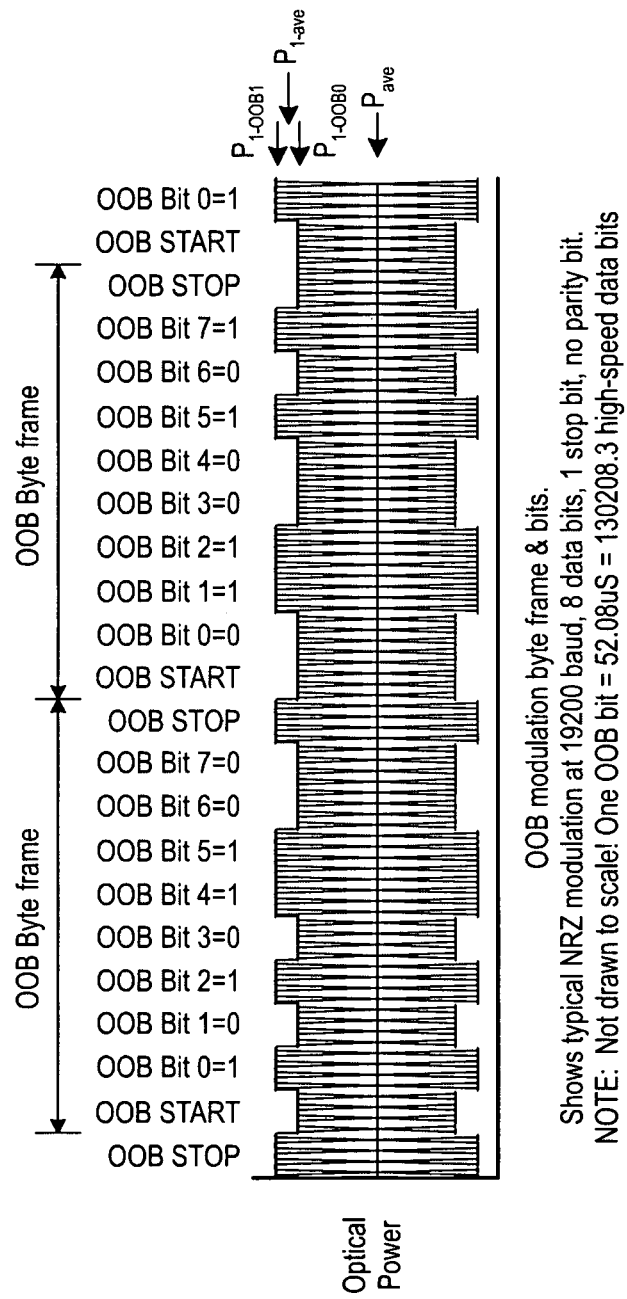

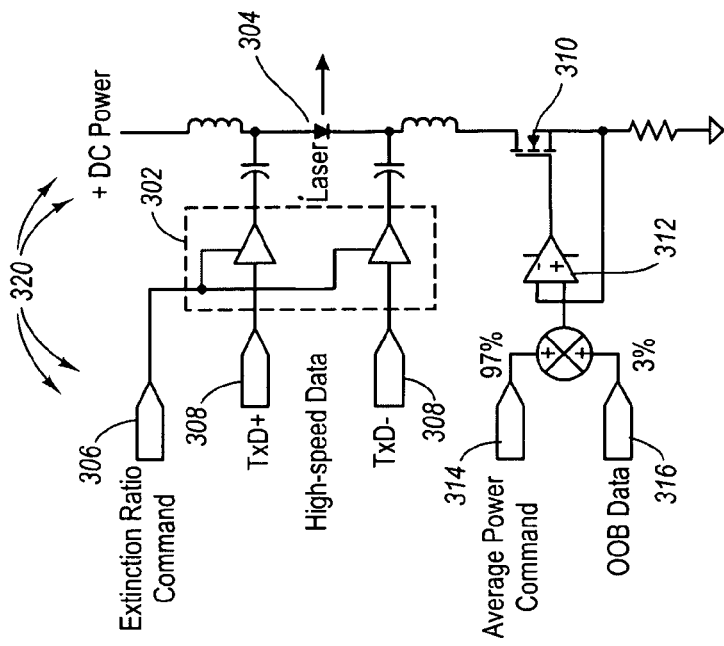
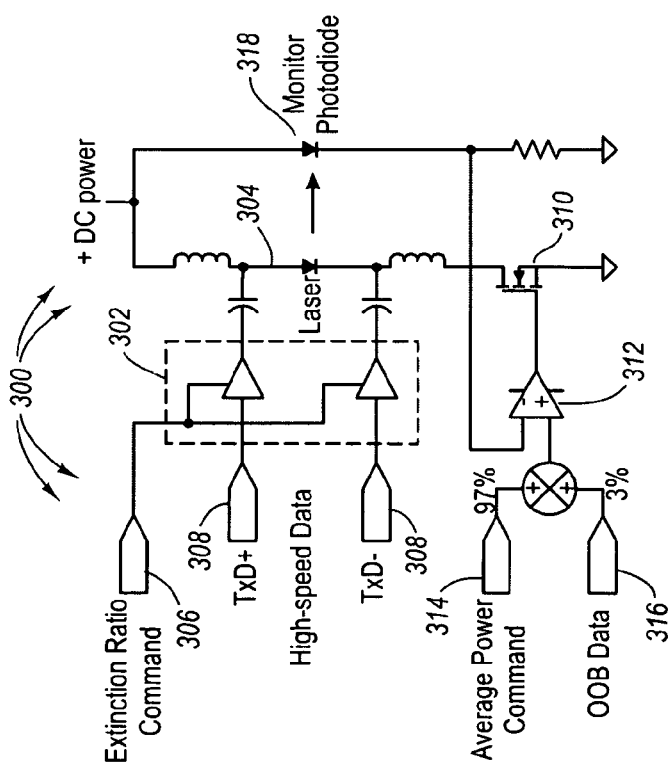
Fig. 3A
Fig. 3B

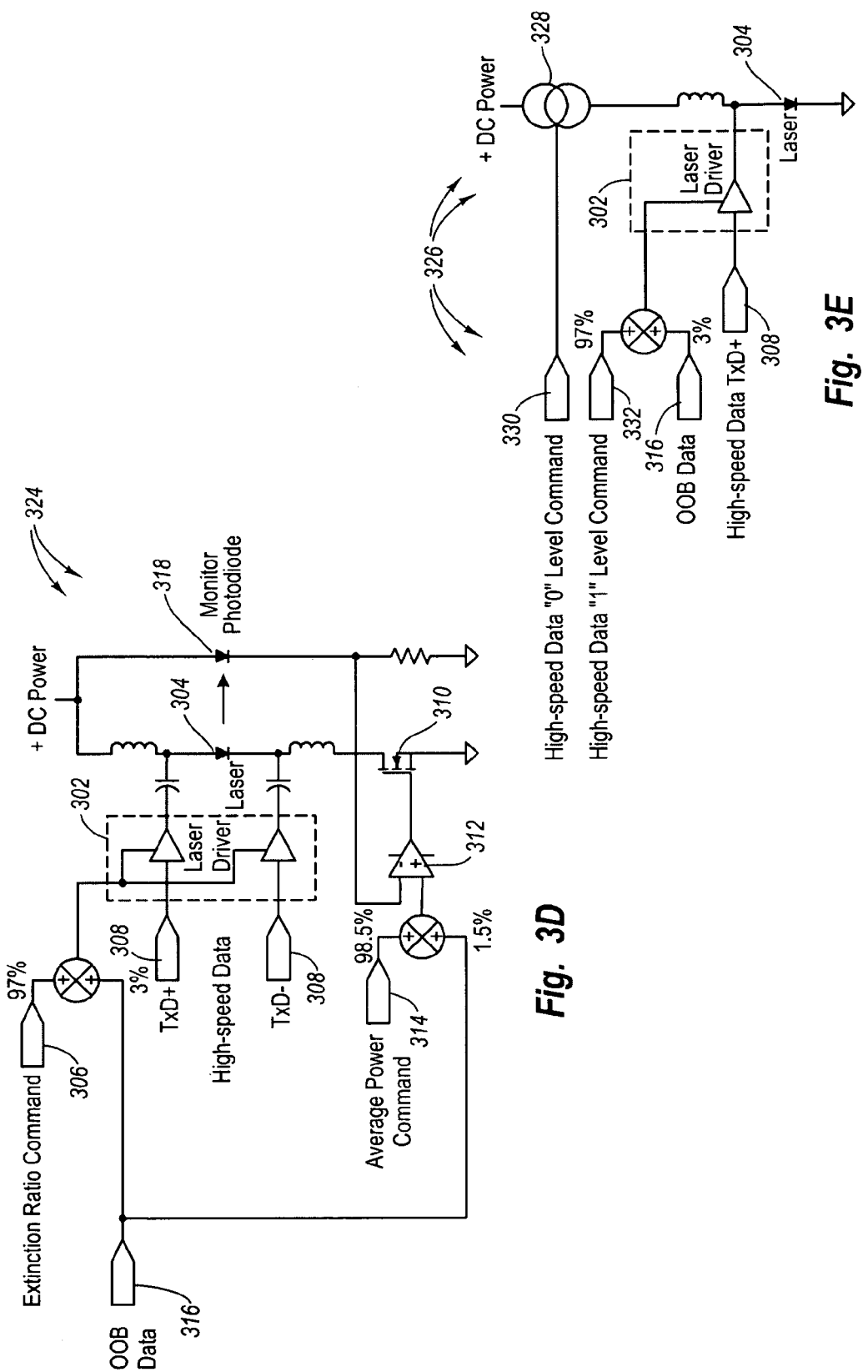

ACCESSING TRANSCEIVER LINK INFORMATION FROM HOST INTERFACE

CROSS-REFERENCE TO RELATED APPLICATIONS

Not Applicable.

BACKGROUND OF THE INVENTION

1. The Field of the Invention

The present invention relates generally to optoelectronic communication devices. More specifically, the present invention relates to a transceiver module in which the diagnostic data and control functions of the remote transceiver to which it is connected are locally accessible without interrupting the transmission of high-speed data.

2. The Relevant Technology

Computing and networking technology have transformed our world. As the amount of information communicated over networks has increased, high-speed transmission has become ever more critical. Many high-speed data transmission networks rely on optical transceivers and similar devices for facilitating transmission and reception of digital data embodied in the form of optical signals over optical fibers. Optical networks are thus found in a wide variety of high-speed applications ranging from as modest as a small Local Area Network (LAN) to as grandiose as the backbone of the Internet.

Commonly, digital communication is accomplished using a model known as the Open Systems Interconnection (OSI) model. The OSI model defines a framework for accomplishing digital communications with seven layers on clients communicating in a network. These seven layers are understood by those of skill in the art, and include from the highest level to the lowest level: the application layer, the presentation layer, the session layer, the transport layer, the network layer, the data link layer, and the physical layer. At the application layer, data is used in end user processes. Data is packaged by each of the other layers of the OSI model prior to being sent using the physical layer. The physical layer defines how the data is actually sent on the network, such as by electrical signals, light carried on optical fibers, radio signals etc. Thus, at the physical layer, actual voltages, light levels and radio amplitudes or frequencies are defined as having certain logical values.

At the physical layer, one method of communicating digital data involves the use of transceivers. Typically, data transmission is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller"), which is the focus here, controls the operation of the laser driver and post amplifier.

In addition to controlling the operation of the laser driver and the post amplifier, the controller may collect and manage diagnostic data. Performance characteristics of an optical transmitter and receiver may vary in response to changes in operational conditions like temperature and voltage. For example, the threshold current and slope efficiency of a laser diode vary with temperature. To ensure the quality and integrity of data transmission, various measurement and compensation circuits may be employed by a transceiver to compensate for these changes. The transceiver controller may evaluate operating conditions, such as, but not limited to, temperature, voltage, and low frequency changes (such as receive power) from the post-amplifier and/or from the laser driver, and then adjust component settings to compensate for any changes. The operating condition parameter values, referred to collectively as "diagnostic data", may also be evaluated by the host computer system which typically has access to the controller via a serial interface.

In addition to, and sometimes in conjunction with managing diagnostic data, a controller may also drive several other transceiver functions, including, but not limited to, the following: (i) setup functions which generally relate to the required adjustments made on a part-to-part basis in the factory to allow for variations in component characteristics such as laser diode threshold current; (ii) identification information identifying the transceiver type, capability, serial number, and compatibility with various standards; (iii) eye safety and general fault detection which are used to identify abnormal and potentially unsafe operating parameters and to report these to the user and/or perform laser shutdown, as appropriate; (iv) temperature compensation functions which compensate for known temperature variations in key laser characteristics such as slope efficiency; and (v) monitoring functions that report various parameter values related to the transceiver operating characteristics and environment such as laser bias current, laser output power, received power level, supply voltage and temperature.

Each transceiver is generally passive with respect to other transceivers. This means that a transceiver simply sends and receives digital data that has been converted to a physical layer level signal without extracting or processing the information represented by the digital data. In other words, transceivers do not generally communicate data to one another for the benefit of the transceivers. Instead, the transceivers communicate data to one another for the benefit of the hosts to which the transceivers are connected.

A transceiver may communicate data for the benefit of the transceiver to the connected host device. For example, a transceiver may be configured to generate digital diagnostic information by monitoring the health of the transceiver. The transceiver may then communicate information about the health of the transceiver to its connected host. This communication typically takes place on an I²C or MDIO bus for communicating between integrated circuits. As a transceiver deteriorates due to age, component failure or other reasons, the host may be aware of the deterioration using such communications received from the transceiver.

Data generated by the controller and the digital diagnostics data described above is generally only available to the host on which a transceiver is installed. Thus, when troubleshooting problems with individual transceivers, a user needs to access the host on which the transceiver is installed to discover any digital diagnostic data about a transceiver. This may cause various difficulties when the host and transceiver are located in a remote location such as on the ocean floor or in remote desert locations.

Some protocols exist where digital diagnostic data can be sent as part of the high-speed data sent on an optical link. However, this generally involves sending the data in some specially defined packet or portion of a packet. Thus to retrieve the digital diagnostic data, the high-speed data is disassembled such as by a framer, the digital diagnostic data extracted, and the high-speed data reassembled. Additionally, if digital diagnostic data is to be added by a transceiver in a chain of transceivers, the high-speed data is disassembled and the digital diagnostic data added in the appropriate portion of the high-speed data, and the high-speed data, including the digital diagnostic data, reassembled. To disassemble and reassemble a high-speed data signal represents a significant unwanted cost in terms of data processing. Additionally, there are time delays as the data is disassembled and reassembled prior to retransmission of the data from link to link.

In other presently existing systems, remote controller and digital diagnostic data may be sent in a high-speed data signal that includes out-of-band data. However, the remote module controller and digital diagnostic data is not accessible unless the local host is configured to receive and display the data in meaningful way. As mentioned above, the host computer system is typically the only available interface between a transceiver module and an end user during operation. Therefore, when a remote transceiver generates and transmits controller or diagnostic data as out-of-band data, end user access to that data depends solely on whether the particular host system in which it operates has the ability to access, process, and then display the data in a meaningful way. And since transceiver diagnostic features are a relatively recently developed technology, legacy host equipment often lack the means to access the data. Newer host equipment, which may be capable of accessing diagnostic data, typically lacks the means to display diagnostic data to an end user. It is therefore difficult for network administrators to determine the status of an individual link and to troubleshoot complex systems.

BRIEF SUMMARY OF THE INVENTION

These and other limitations are overcome by embodiments of the invention which relate to a transceiver module in which the diagnostic data and control functions of a remote transceiver module are locally accessible without interrupting the transmission of high-speed data. This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments of the present invention include systems and methods for accessing the digital diagnostic data and controller data of a remote transceiver module via the diagnostic port of a local transceiver. In a network, a local transceiver may transmit high speed data to and receive high speed data from a remote transceiver over optical fibers. Principles of the invention allow a local user to access the remote transceiver diagnostic and controller data by sending and/or receiving out-of-band-data on the high-speed signal. The out-of-band data representing the remote module diagnostic and/or controller data is externally accessible via the local transceiver's diagnostic port without interrupting the transmission of high-speed data over the fiber and without removing the local transceiver from the host.

Certain embodiments of the invention involve modulating high-speed data and out-of-band data as a double modulated signal, wherein the out-of-band data includes the remote transceiver controller and digital diagnostic data, which is subsequently accessible by an external user device from the diagnostic port of the local transceiver. The double modulated signal is transmitted on a physical link between components in a network of connected hosts. Thus, high-speed data that is ordinarily transmitted on a physical link can be transmitted with out-of-band data on the same physical link. This allows for the transmission of information such as remote module diagnostic information, authentication information, rate negotiation information, configuration information, etc. from the remote transceiver to the local transceiver. The remote transceiver data may then be accessed from the local transceiver with an external user device via the diagnostic port without interrupting the transmission of high-speed data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2E illustrates a high-speed data signal modulated with out-of-band data where the out-of-band data is modulated on the extinction ration of the high-speed data signal;

FIG. 3A illustrates an apparatus for modulating out-of-band data onto the average power of a high-speed data signal, where the apparatus includes feedback from a monitor photodiode;

FIG. 3B illustrates an apparatus for modulating out-of-band data onto the average power of a high-speed data signal;

FIG. 3D illustrates an apparatus for modulating out-of-band data onto the peak power of a high-speed data signal;

FIG. 3E illustrates an apparatus for modulating out-of-band data onto the peak power of a high-speed data signal;

DETAILED DESCRIPTION OF THE SELECTED EMBODIMENTS

Figure 1:
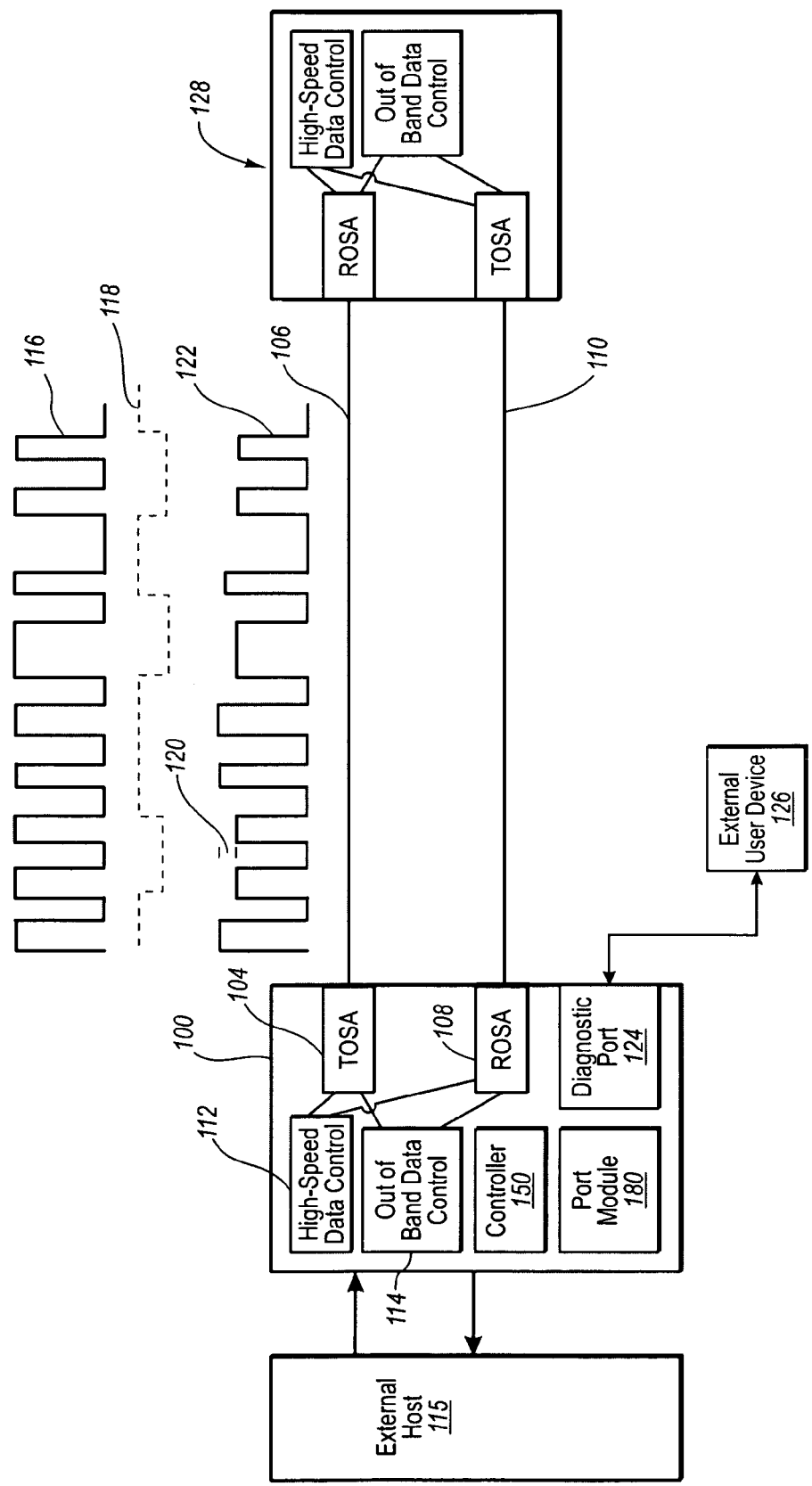
FIG. 1 illustrates an example of a system overview having an optical transceiver that may implement features of the present invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Embodiments of the present invention include systems and methods for accessing the digital diagnostic data and/or controller data of a remote transceiver module via the diagnostic port of a local transceiver. In a network, a local transceiver may transmit high speed data to and receive high speed data from a remote transceiver over optical fibers. Examples of the present invention allow a local user to access the remote transceiver diagnostic and controller data by sending and/or receiving out-of-band-data on the high-speed signal. The out-of-band data representing the remote module diagnostic and/or controller data is externally accessible via the local transceiver's diagnostic port without interrupting the transmission of high-speed data over the fiber and without removing the local transceiver from the host. The invention involves modulating high-speed data and out-of-band data as a double modulated signal, wherein the out-of-band data includes the remote transceiver controller and digital diagnostic data, which is subsequently accessible from the diagnostic port of the local transceiver. The double modulated signal is transmitted on a physical link between components in a network of connected hosts. Thus, high-speed data that is ordinarily transmitted on a physical link can be transmitted with out-of-band data on the same physical link. This allows for the transmission of information such as remote module diagnostic information, authentication information, rate negotiation information, configuration information, etc. from the remote transceiver to the local transceiver. The remote transceiver data may then be accessed from the local transceiver with an external user device via the diagnostic port without interrupting the transmission of high-speed data.

As mentioned above, in addition to controlling the operation of the laser driver and the post amplifier, the transceiver controller collects and manages diagnostic data and other performance data. Further, a controller may also drive several transceiver functions, including setup functions, eye safety and general fault detection, temperature compensation functions, monitoring functions, etc. As such, transceiver controller functions and diagnostic data are integrally associated with and have significant affects on with many aspects of network administration.

Typically, transceivers communicating high speed data over a network do not have access to the controller and diagnostic data of the remote transceiver to which they are communicating. In the limited case in which remote transceiver diagnostic data is available locally, the local host computer system is the only available interface between a transceiver module and an end user during operation. Therefore, when a remote transceiver generates and transmits diagnostic data, local end user access to that data depends solely on whether the particular host system in which it operates has the ability to access, process, and then display the data in a meaningful way. And since transceiver diagnostic features are a relatively recently developed technology, legacy host equipment often lack the means to access the data. Newer host equipment, which may be capable of accessing diagnostic data, typically lacks the means to display diagnostic data to an end user. It is therefore difficult for network administrators to determine the status of an individual link and to troubleshoot complex systems.

Embodiments of the present invention enables an end user to bypass the difficulties and impediments associated with gaining access to a remote transceiver diagnostic and controller data via the host equipment by creating a direct link to the remote transceiver data with out-of-band modulation accessible locally via the diagnostic port of the local transceiver, although other ports may also be used in certain embodiments. Further, the monitoring functions of the remote transceiver controller can be interrogated to gain access to the various operational parameter values, and network problems may be isolated based on those values. Depending on the particular problem, a user may be able to correct it by manipulating the data contained in certain functions of the remote controller, i.e., a remote transceiver's operating characteristics may be adjusted to compensate for issues on the network. For example, if a remote transceiver is receiving a weak signal from the local transceiver, an analysis of certain operational parameters may isolate the source of the problem. If it is determined that the weak signal is the result of a distant crimp in the fiber, which would be time-consuming and expensive to fix, a user could manipulate data contained in the remote transceiver's controller to increase the laser output power to compensate for the crimp; thereby, restoring the link with minimal downtime and expense.

Additionally, a user may fine-tune certain operational parameters in the controller's setup function to allow the remote transceiver to operate in conformance with specific link conditions. The ability to fine-tune operational parameters of a remote transceiver while it is operating over a network allows the end-user to make the proper adjustments quickly and efficiently. The ability to fine-tune parameters is increasingly more useful because, as optics technology advances, high capacity link conditions require increasingly precise parameter values to operate as intended. For example, wavelength-division multiplexing ("WDM"), which multiplexes multiple signals on a single link by using different wavelengths to carry different signals, requires extremely precise laser temperature and frequency controls. Access to the remote transceiver controller setup function enables a local user to configure a module's relevant operating characteristics in real-time precisely as required by the particular link on which it is being used.

System Overview

Referring to the system overview illustrated in FIG. 1, exemplary embodiments of the invention relate to an optical transceiver module 100 having a diagnostic port 124, wherein the port is configured to access remote module controller and diagnostic data transferred as out-of band data from the remote transceiver 128 to the local transceiver 100. Controller data from the remote transceiver, including operational parameter values and module setup values, is accessible locally while the local transceiver 100 operates in conjunction with an external host 115, as represented by arrows 170 and 175, and may be retrieved, and sometimes modified, in real time without interrupting normal transceiver operation or suspending the transmission of high-speed data over optical fibers 106 and 110. The remote module controller data is accessed with an external user device 126 by means of the diagnostic port 124 which may be integrated into the face of the transceiver module 100.

External user devices that may be employed in conjunction with the invention include PCs, cellular telephones, PDAs, laptop computers and any other device having a presentation mechanism or an associated presentation mechanism and is suitably equipped to establish communication with the diagnostic port 124 on the outside of the transceiver module 100. In particular, exemplary embodiments of the invention are directed to the use of a laptop computer as an external user device. However, exemplary embodiments of the invention should not be construed to be limited to the use of laptop computers.

The transceiver module 100 includes a transmitter optical subassembly (TOSA) 104 for transmitting signals across a physical link 106. The transceiver module 100 also includes a receiver optical subassembly (ROSA) 108 for receiving optical signals across a physical link 110. The TOSA 104 is connected to a high-speed data control 112, which may include a high-speed modulator that modulates the power output of a signal power source such as a laser in the TOSA 104 such that the high-speed data is converted to a form that can be transmitted across the physical link 106. As shown in FIG. 1, the high-speed data control 112 modulates the TOSA 104 to produce a high-speed physical layer data signal 116. Also connected to the TOSA 104 is an out-of-band data control 114. The out-of-band data control 114 further modulates the laser in the TOSA 104 using an out-of-band data modulator such that an out-of-band data stream 118 is modulated onto the high-speed data signal 116 to produce an outgoing double modulated signal 122 that includes high-speed and out-of-band data. The out-of-band data stream 118 may include data from the external host 115, data from the external user device 126 sent via the diagnostic port 124 through the port module 180 to the controller 150, or internal local transceiver data created by or collected by the controller 150.

In the example shown, the modulations of the out-of-band data appear as a change in peak power 120 of the outgoing double modulated signal 122. Thus the outgoing double modulated signal 122 includes both high-speed data and out-of-band data. The out-of-band data may be modulated using a number of different modulation techniques including but not limited to phase shift keying, binary phase shift keying, quadrature phase shift keying, and Manchester encoding. The out-of-band data may actually have a frequency range that is orders of magnitude less than the in-band data. However, to illustrate the principle of double modulation in a simple graphical form, the frequency of the out-of-band data stream 118 is illustrated in FIG. 1 as having only a slightly lower frequency than the high-speed data signal 116. Regardless, the principles of the present invention are not limited to the relative frequency between the out-of-band data stream 118 and the high-speed data signal 116.

To perform receiving functions, the ROSA 108 includes a signal reception element such as a photodiode that receives an incoming double modulated signal. The ROSA 108 sends all or portions of the incoming double modulated signal to the out-of-band data control 114 and the high-speed data control 112. The out-of-band data control 114 may include an out-of-band detector that extracts the out-of-band data from the incoming double modulated signal. The high-speed data control 112 may include a high-speed data amplifier that extracts high-speed data from the incoming double modulated signal. The out-of-band data control 114 sends received data to the controller 150 where it may be transferred to the external host 115 or the port module 180. Data received by the port module 180 may be accessed by the external user device 126 via the diagnostic port 124. In some instances, the high-speed control 112 and the out of band data control 114 are integrated.

While the optical transceiver 100 will be described in some detail, the optical transceiver 100 is described by way of illustration only, and not by way of restricting the scope of the invention. The principles of the present invention are suitable, by way of example only, for 1G, 2G, 4G, 8G, 10G, 40G, 100G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

Transmission of Out-of-Band Data

Figure 2A:
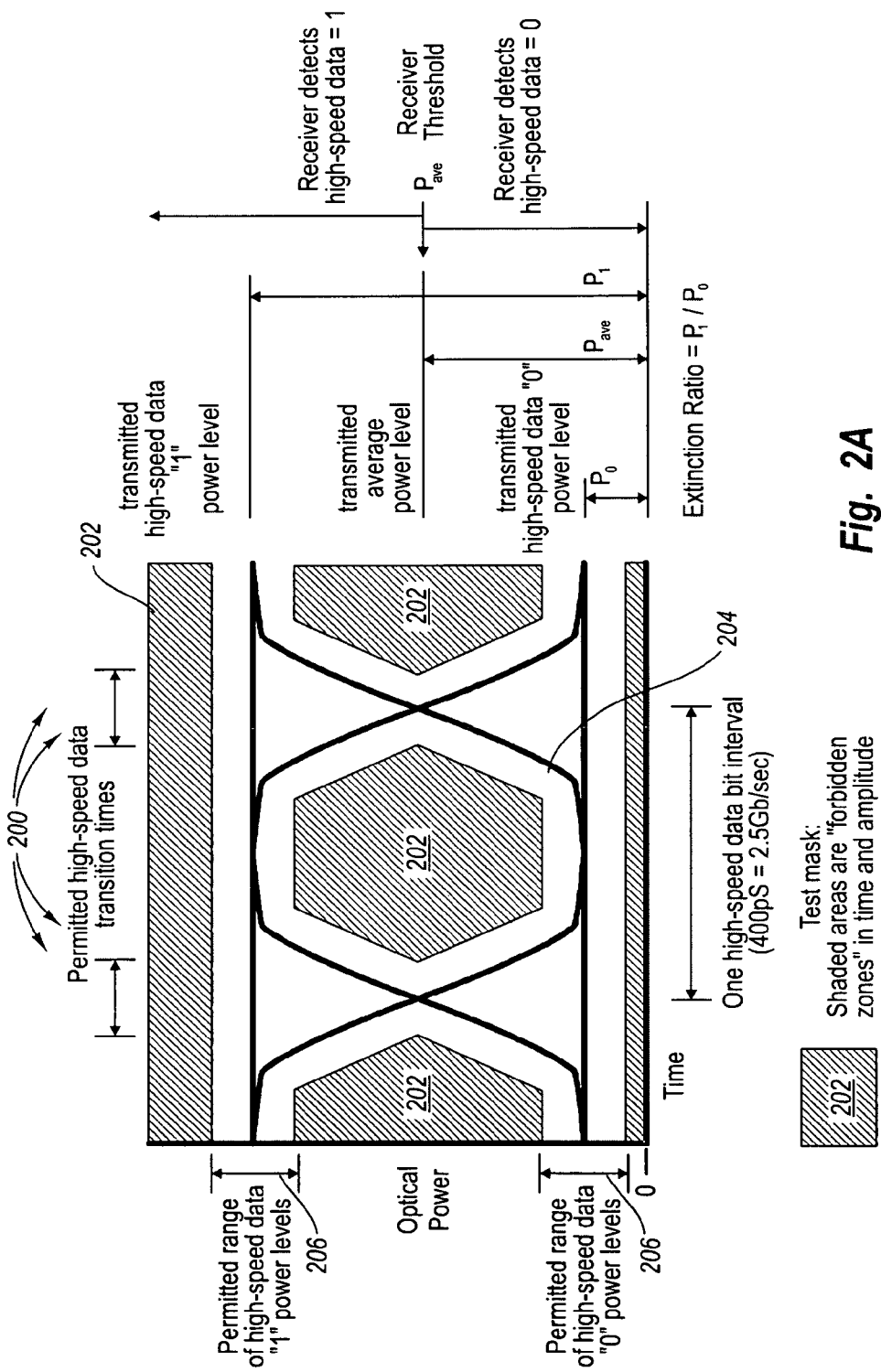
FIG. 2A illustrates an eye diagram showing channel margins that may be used to modulate out-of-band data onto a high-speed data signal while still maintaining an appropriate extinction ratio.

Referring now to FIG. 2A principles of embodiments of the present invention may be understood in reference to an eye diagram 200. The eye diagram 200 is a graphical representation of signal quality formed by the superposition of multiple bits of data. The eye diagram 200 includes shaded regions which are forbidden zones 202. If the boundary of a bit falls within the forbidden zones 202, that bit will likely be interpreted as an error. Thus data transmitted across a physical link should be transmitted so that the data does not fall within the forbidden zones 202. Certain specifications require that only a limited number of bits be interpreted as errors. This is usually expressed as a required bit error rate (BER). The BER can be described or quantified based on the eye diagram. The appropriate BERs may be expressed in a communications standard, such as the 10 Gigabit Ethernet standard, which specifies BERs no greater that $10^{-12}$.

Bit error rates may also be specified by customer expectations or requirements. Often the BER required by customers purchasing communication equipment exceeds the BER specified by a particular communication standard. The BER is a function of the extinction ratio and the average power ($P_{ave}$ in FIG. 2A) received by a transceiver. Physical layer specifications often specify BER as a minimum and maximum extinction ratio. The extinction ratio is the ratio of the power level received by a transceiver when a "1" high-speed bit is transmitted ($P_1$ in FIG. 2A) to the power level received by a transceiver when a "0" high-speed bit is transmitted ($P_0$ in FIG. 2A). Thus, the extinction ratio is expressed as $P_1/P_0$. A particular extinction ratio will cause a sufficient number of high-speed bits to fall within a bit margin 204 that is outside of the forbidden zone 202 to achieve a required BER.

Also shown in FIG. 2A, is a channel margin 206 that defines power levels where high-speed data bits can still exist and not be interpreted as errors. The channel margin 206 may facilitate embedding out-of-band data onto a high-speed data signal.

Figure 2B:
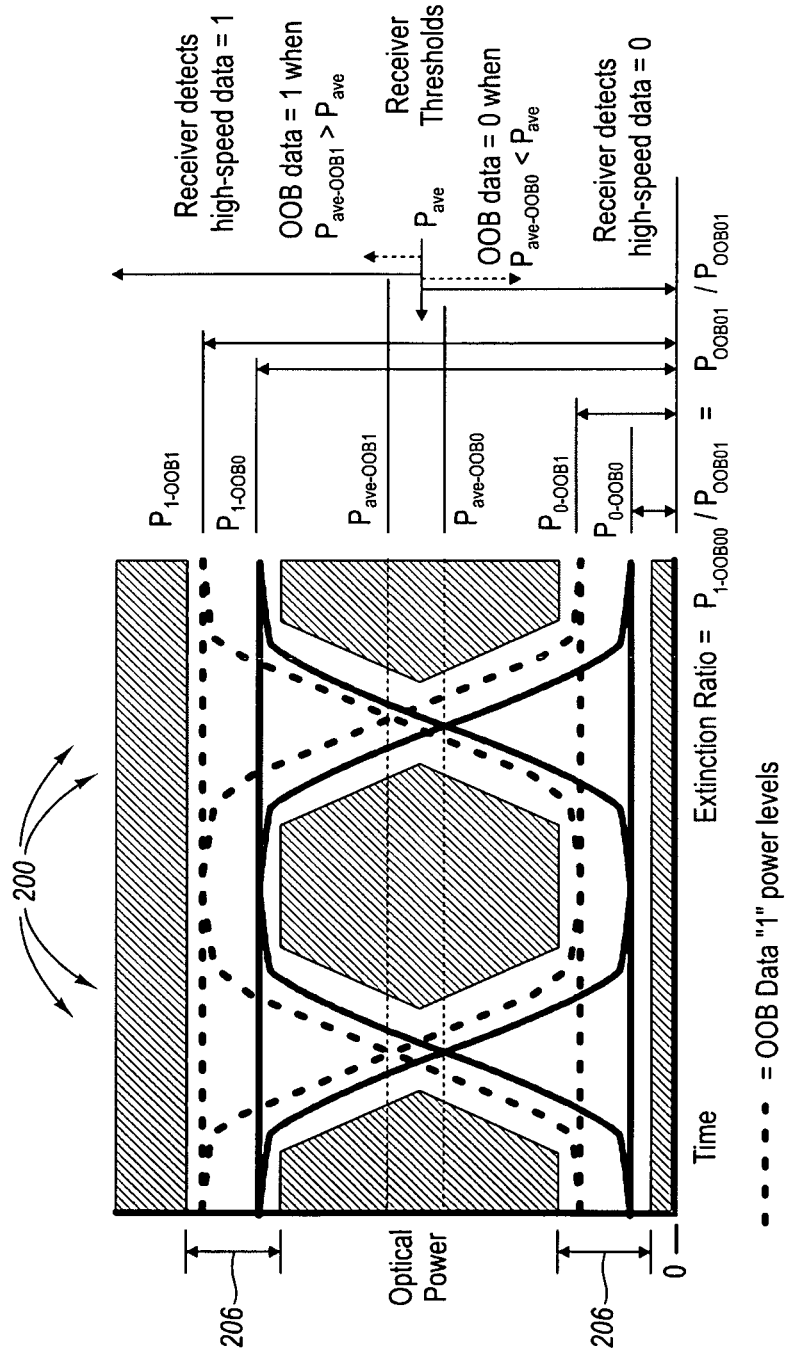
FIG. 2B illustrates an eye diagram showing out-of-band data modulated using an average power setting of a transmitter.

In one embodiment of the invention, the out-of-band data may be embedded onto the high-speed data by modulating the average power of the high-speed bits transmitted. This example is illustrated by the eye diagram in FIG. 2B. The eye diagram is modulated within the channel margins 206. In FIG. 2B, the eye diagram has the same extinction ratio whether a "0" out-of-band data bit or a "1" out-of-band data bit is being transmitted. In other words, $P_{1\text{-}OOB0}/P_{0\text{-}OOB0} = P_{1\text{-}OOB1}/P_{0\text{-}OOB1}$ where $P_{1\text{-}OOB0}$ is the power transmitted with a "1" high-speed bit and a "0" out-of-band bit, $P_{0\text{-}OOB0}$ is the power transmitted with a "0" high-speed bit and a "0" out-of-band bit, $P_{1\text{-}OOB1}$ is the power transmitted with a "1" high-speed bit and a "1" out-of-band bit and $P_{0\text{-}OOB1}$ is the power transmitted with a "0" high-speed bit and a "1" out-of-band bit. Thus, an appropriate BER can be maintained while modulating the out-of-band data onto the high-speed data.

Figure 2C:
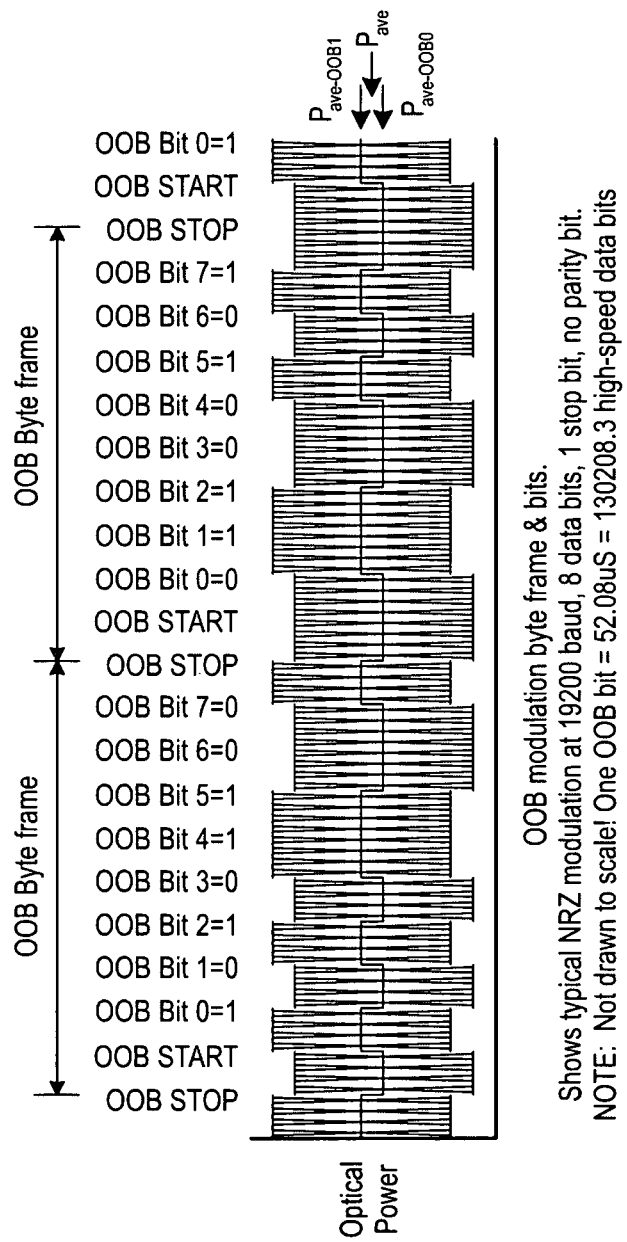
FIG. 2C illustrates a high-speed data signal modulated with out-of-band data where the out-of-band data is modulated on the average power of the high-speed data signal.

Illustratively, FIG. 2C shows an out-of-band bit stream modulated onto a high-speed bit stream. Notably, the bit streams in FIG. 2C are not drawn to scale. Typically, an out-of-band bit stream, in the embodiment shown, may be NRZ modulation at 19200 baud, whereas the high-speed data is at 2.5 Gbits/s. In this example, this results in about 130,000 high-speed bits per out-of-band bit. Thus, for clarity, FIG. 2C is not drawn to scale. FIG. 2C shows the average power of an optical signal modulated according to an out-of-band bit stream.

Figure 2D:
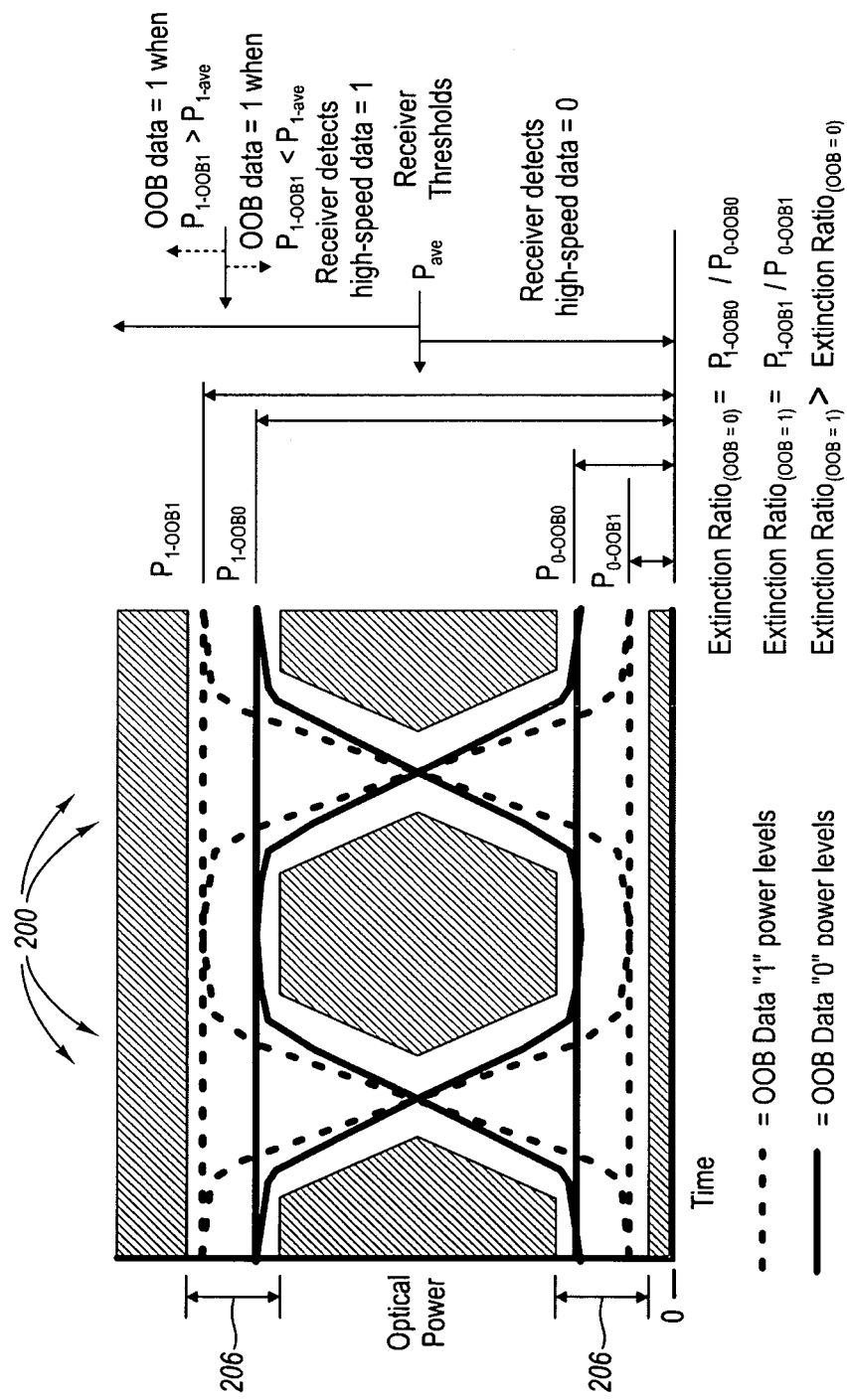
FIG. 2D illustrates an eye diagram showing out-of-band data modulated using an extinction ratio.

In an alternate embodiment of the invention shown in FIGS. 2D and 2E, the out-of-band data is modulated onto the extinction ratio. In this example, the average power remains constant, while the peak power, at both the highest and lowest power outputs, is modulated according to an out-of-band bit stream. FIG. 2D shows that the extinction ratio when a "1" out-of-band bit is being transmitted is greater than when a "0" out-of-band bit is being transmitted. Viewed alternatively as shown in FIG. 2E, when a "1" out-of-band bit is transmitted, the high-speed "1" bits are transmitted with a higher power than when a "0" out-of-band data bit is transmitted. Additionally, when a "1" out-of-band bit is being transmitted, a "0" high-speed bit is transmitted with less power than when a "0" out-of-band bit is being transmitted. Thus the out-of-band data behaves similar to an amplitude modulation of the high-speed data.

Figure 2F:
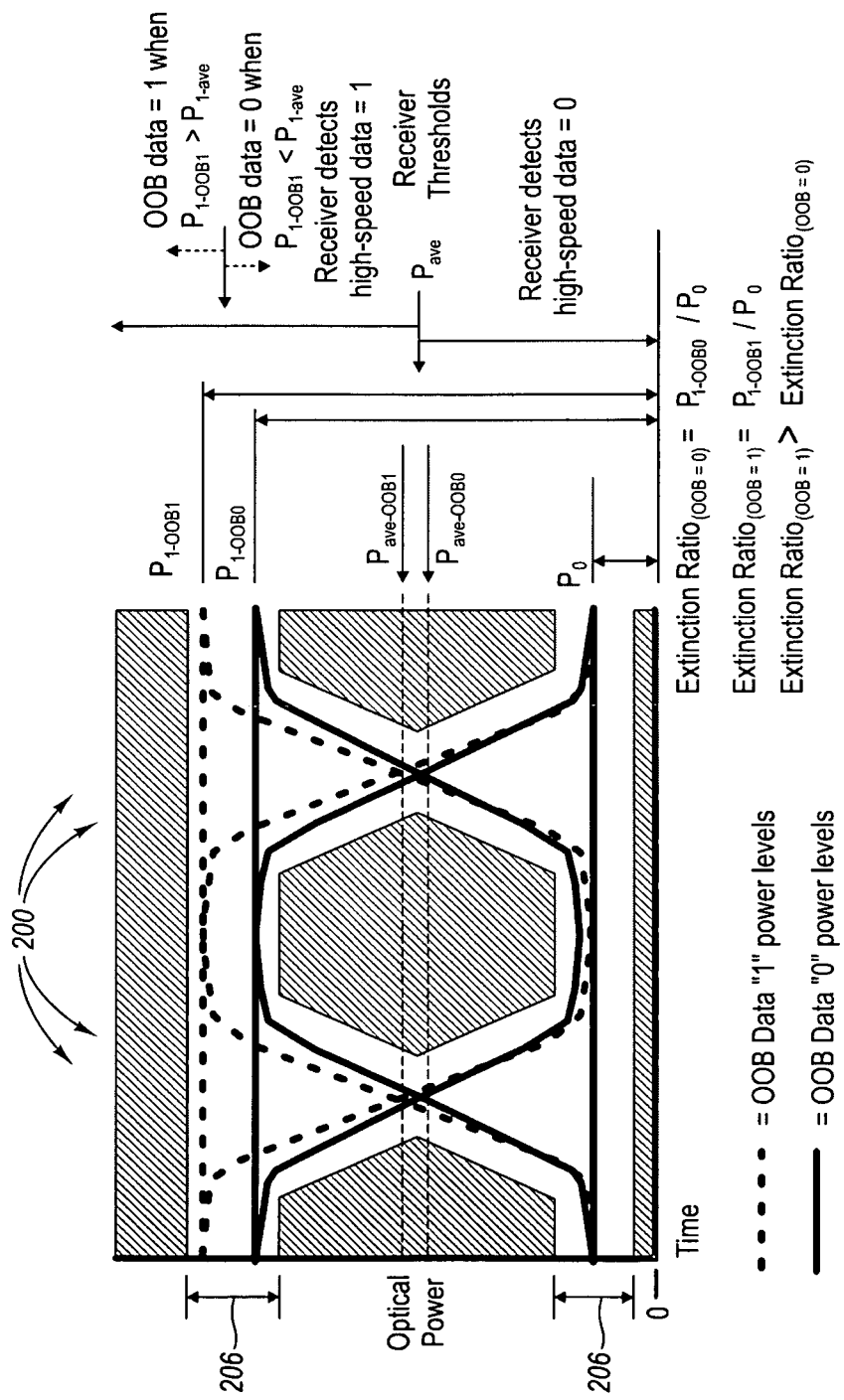
FIG. 2F illustrates an eye diagram showing out-of-band data modulated using peak power.
Figure 2G:
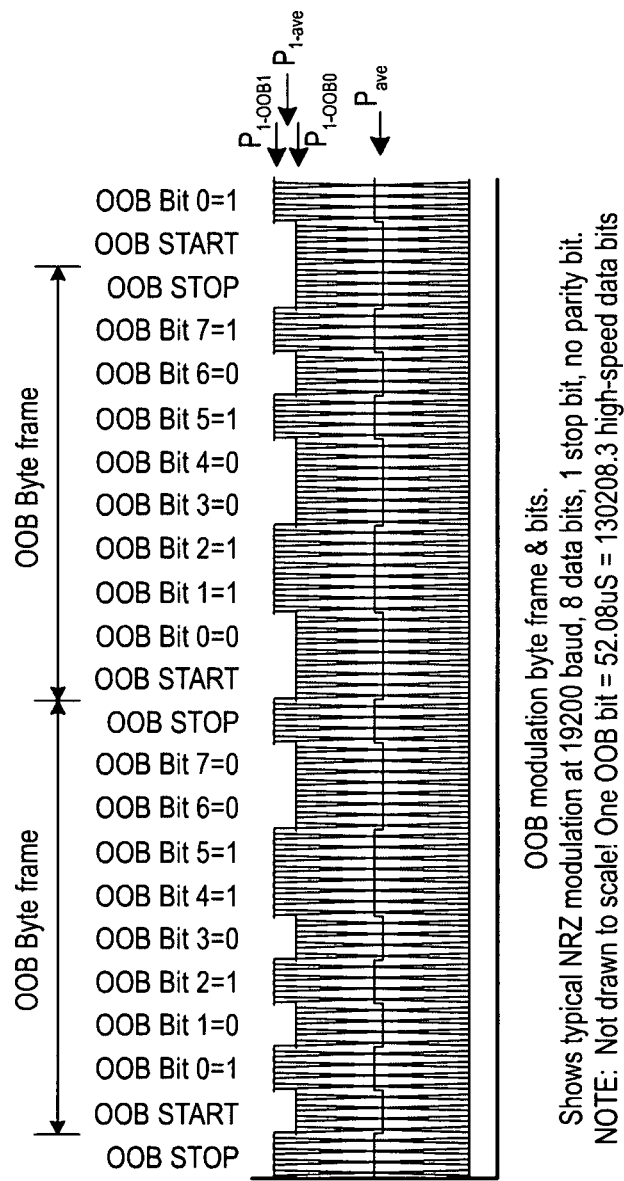
FIG. 2G illustrates a high-speed data signal modulated with out-of-band data where the out-of-band data is modulated on the peak power of the high-speed data signal.

Another embodiment of the invention, as shown in FIGS. 2F and 2G, modulates a combination of the peak power of the high-speed data and the average power of the high-speed data with out-of-band data. In the example shown, the out-of-band bit stream is modulated onto the high-speed "1" bits. Thus in this case, the extinction ratio of the transmitted optical signal is higher when a "1" out-of-band bit is sent than when a "0" out-of-band bit is sent. Viewed differently, the "1" high-speed bits are transmitted with more power when an out-of-band "1" bit is transmitted than when an out-of-band "0" bit is transmitted. This embodiment may help to simplify high-speed data receiver designs.

Referring now to FIGS. 3A and 3B, transmitter designs are illustrated that can be used to modulate the average power of a high-speed data signal with out-of-band data. A transmitter 300 includes a laser driver 302 connected to a laser 304. The laser driver 302 accepts as one input, an extinction ratio command 306. The extinction ratio command 306 controls the extinction ratio of signals transmitted by the transmitter 300. The laser driver 302 further includes a high-speed data input 308, which is a differential input accepting high-speed electrical signals. Using the high-speed data input 308, the laser driver modulates the laser 304 output power.

The transmitter 300 includes various components in a bias circuit for controlling the average power output of the laser 304. The bias circuit includes a transistor 310 that controls a bias current through the laser 304. The transistor 310 is controlled by an amplifier 312. The amplifier 312 has, as one input, the sum of an average power command 314 and an out-of-band data signal 316. The out-of-band data signal 316 causes the average power output of the laser 304 to be modulated according to the out-of-band data signal 316. Modulating using the laser driver 302 and the bias circuit creates a double modulated signal including both high-speed and out-of-band data. In the example shown, the average power command 314 represents 97% of the amplifier 312 input whereas the out-of-band data signal 316 represents 3% of the amplifier 312 input. These are only exemplary numbers and other ratios may be used. The amplifier 312 has as feedback, a signal from a monitor photodiode 318. The monitor photodiode 318 monitors the output power of the laser diode 304 and allows a current to flow through the monitor photodiode 318 that is proportional to laser output power. This current is used to generate a signal that is fed into the amplifier 312 as a feedback signal. In this way, the average power output of the laser 304 can be maintained at a constant level dictated by the combination of the average power command signal 314 and the out-of-band data signal 316.

FIG. 3B illustrates another transmitter that may be used to modulate the average power output of the laser 304 with out-of-band data. The transmitter 320 of FIG. 3B is similar to the transmitter 300 of 3A. However, the transmitter of 3B excludes the monitor photodiode 318 of FIG. 3B. Instead, amplifier 312 receives a feedback signal that is essentially proportional to the current through the laser 304.

Figure 3C:
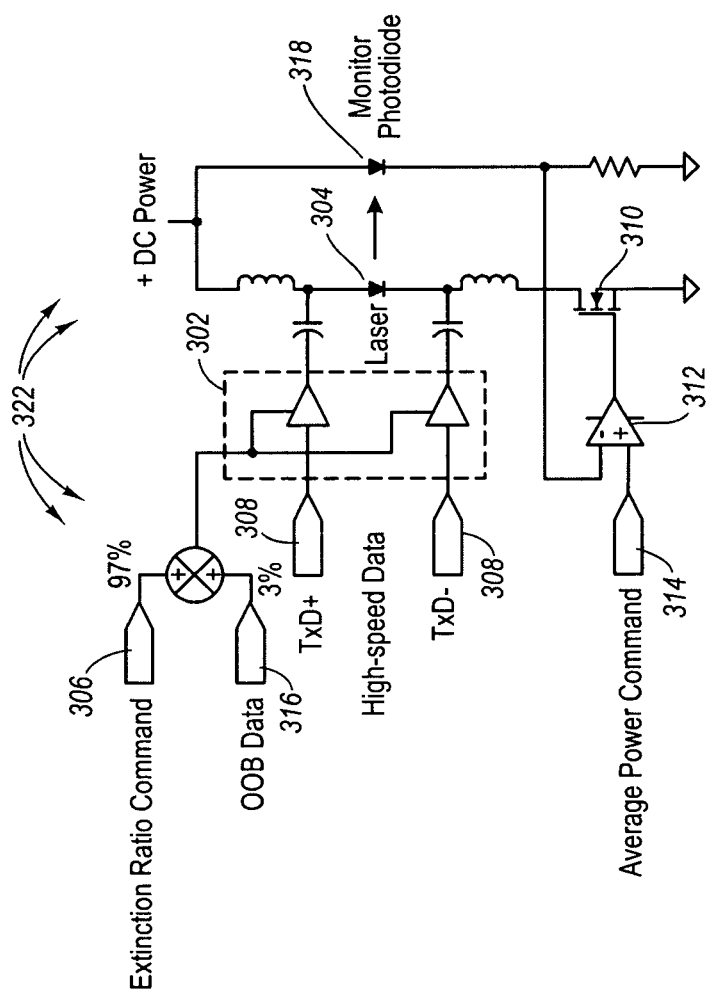
FIG. 3C illustrates an apparatus for modulating out-of-band data onto the extinction ratio of a high-speed data signal.

FIG. 3C illustrates a transmitter 322 that may be used to modulate out-of-band data as a modulation of the extinction ratio such as the modulation shown in FIGS. 2D and 2E. The transmitter 322 includes a laser driver 302 which has as one input the high-speed data signal 308 to modulate the laser 304. Another input into the laser driver is the combination of an extinction ratio command signal 306 and the out-of-band data signal 316. This causes the laser 304 to produce a double modulated optical signal including both the high-speed data and the out-of-band data. The transmitter 322 also includes circuitry to control the average power output of the laser 304 such as the transistor 310, the amplifier 312 and the monitor photodiode 318. As with the embodiment shown in FIG. 3B, the monitor photodiode 318 may be eliminated in favor of other types of average power feedback.

FIGS. 3D and 3E illustrate transmitter circuits for modulating a combination of the peak power of the high-speed data and the average power of the high-speed data with out-of-band data such as is illustrated by the modulation shown in FIGS. 2F and 2G. The transmitter 324 shown in FIG. 3D includes a laser driver 302 that has a differential high-speed data input 308 for modulating the laser 304 with high-speed data. The laser driver also has an input that is the combination of an extinction ratio command 306 and an out-of-band data signal 316. The output power of the laser 304 is further modulated by the bias circuitry including the amplifier 312 and transistor 310. The amplifier 312 has as one input a combination of an average power command 314 and the out-of-band data signal 316. The modulation of the out-of-band data signal causes the amplifier 312 and transistor 310 to modulate the average power of the laser 304. Notably, to obtain the modulation shown in FIGS. 2F and 2G, when the modulation at the laser driver has a ratio of 97% extinction ratio command to 3% out-of-band data, the ratio of average power command is 98.5% to 1.5% out-of-band data. As mentioned above, those of skill in the art will recognize that other ratios may be used such as 95% extinction ratio command to 5% out-of-band data when the average power command is 97.5% to 2.5% out-of-band data. Notably, only two examples of ratios have been demonstrated here when in fact multiple other examples are contemplated by embodiments of the invention. The channel margin 206 allows for, in theory, an unlimited number of ratios for each of the embodiments set forth above. In practice, the ratios are limited by the sensitivity of various components within a system.

FIG. 3E illustrates yet another embodiment of a transmitter that modulates a combination of the peak power of the high-speed data and the average power of the high-speed data with out-of-band data such as is illustrated by the modulation shown in FIGS. 2F and 2G. FIG. 3E shows a transmitter 326. The transmitter 326 includes a current source 328 for biasing the laser 304. The current source 328 has as an input a high-speed data "0" level command 330 that defines the amount of current supplied to the laser 304 when a high-speed data "0" bit is to be transmitted. A laser driver 302 is connected to the laser 304. The laser driver receives as one input a high-speed data signal 308 that modulates the laser power according to the high-speed data signal 308. Notably, the laser driver 302 is shown modulating using only a single drive signal. The laser driver 302 will nonetheless receive a differential signal which will be converted by the laser driver 302 to a single drive signal for modulating the laser 304. The laser driver 302 also includes an input that is the combination of a high-speed data "1" level command 332 and the out-of-band data signal 316. The high-speed data "1" level command 332 defines the additional power that is output by the laser 304 when a high-speed data "1" bit is to be transmitted. By combining the high-speed data "1" level command 332 with the out-of-band data signal 316, the out-of-band data is modulated onto the "1" bits of the high-speed data as is shown in FIGS. 2F and 2G.

Reception of Out-of-Band Data

Figure 4:
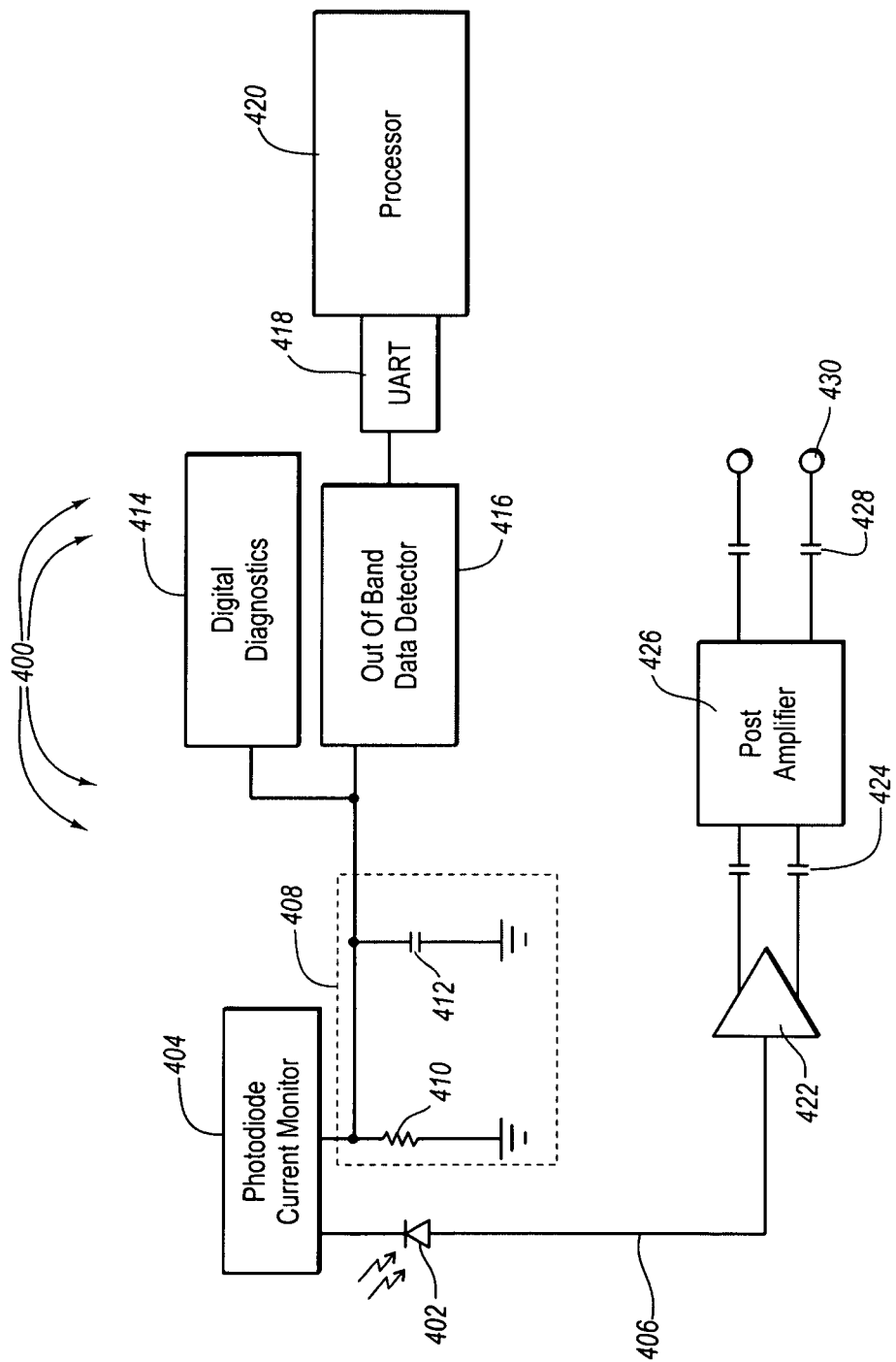
FIG. 4 illustrates an apparatus for receiving a double modulated signal and for extracting high-speed data and out-of-band data from the double modulated signal.

Referring now to FIG. 4, an exemplary receiver for receiving an incoming double modulated signal is shown. Receiver 400, in this example includes a signal reception element that, in this case, is a photodiode 402 for receiving a physical layer signal that is an optical signal, from a physical link. The photodiode 402 converts the physical layer signal into an incoming double modulated electronic signal that in this example is a current through the photodiode 402. The photodiode 402 is connected to a photodiode current monitor 404 that monitors the current through the photodiode 402. The current monitor 404 is connected, in the example shown, to a peak detector 408 that can be used to create a signal that can be fed into an out-of-band detector 416. The out-of-band data detector 416 converts the average power, peak power or extinction ratio of the optical signal received at the photodiode 402 into an out-of-band data stream. This out-of-band data stream is fed into a UART 418 or other suitable component and further into a microprocessor 420 for use of the out-of-band data stream. The microprocessor 420 may transmit the out-of-band data to the transceiver's diagnostic port so that it may be accessed by an external user device. In embodiments where the out-of-band data has been modulated using modulation techniques such as Manchester encoding, phase shift keying and the like, the out-of-band data detector 416 includes a demodulator to demodulate the out-of-band data.

In one embodiment of the invention, the out-of-band data detector may be a commercial infrared (IR) remote control decoder, such as those typically used in television remote controls or other such equipment. Suitable decoders include receivers such as T2525, T2527 and U2538B, available from Amtel Corporation in San Jose, Calif. IR remote control decoders are adapted to receiving out-of-band data signals. IR remote control decoders are designed to decode signals derived from ambient lighting, such as incandescent and other lights, and modulated IR light signals from a control transmitter, and to extract the modulated control signals from the background noise of the ambient light. This situation is somewhat analogous to embedding a relatively small out-of-band data signal on a much larger high-speed data signal. Thus, the IR remote control decoders may provide a way to implement embodiments of the present invention.

Small currents occur in the photodiode 402 when optical signals contact the photodiode. These small currents pass through a high-speed data input 406 and are fed into a high-speed data amplifier, which, in this example, is a transconductance amplifier 422. The transconductance amplifier 422 converts the current from the high-speed data input 406 into a differential high-speed data voltage signal. The differential high-speed data voltage signal passes through filtering capacitors 424 to a post amplifier 426. The filtering capacitors 424 remove frequencies below a given threshold such that only high-speed data is transmitted to the post amplifier 426. The post amplifier 426 performs appropriate signal processing of the high-speed data signal. This processed high-speed data signal is then sent through additional filtering capacitors 428 and finally to output terminals 430, where it is available to a device having need of the high-speed data signal, such as a host device.

Out-of-Band Communication in a Transceiver Having a Diagnostic Port

Figure 5:
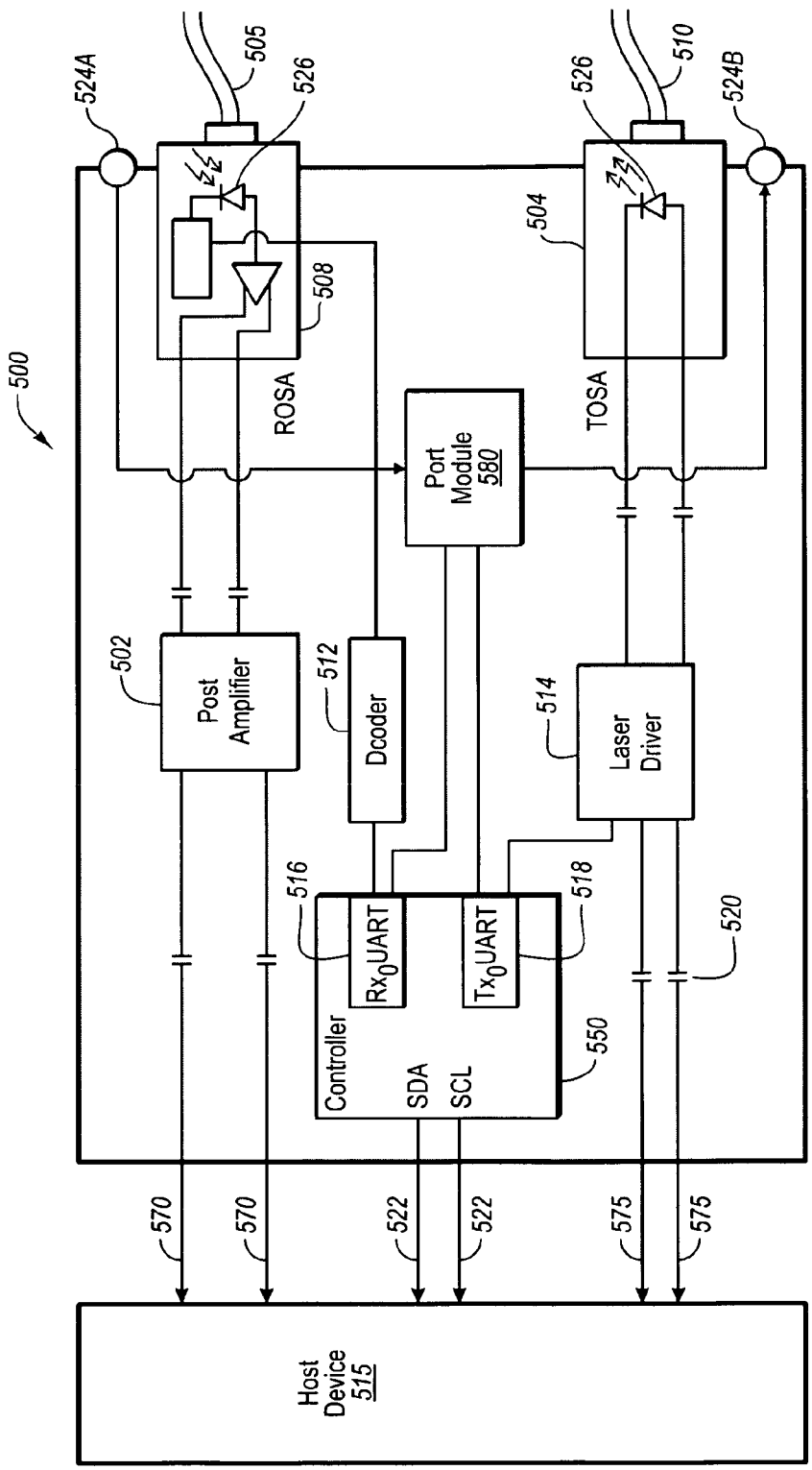
FIG. 5 illustrates a transceiver having a diagnostic port and including hardware for sending and receiving high-speed data and out-of-band data.

FIG. 5 illustrates an exemplary embodiment of an optical transceiver capable of both transmitting and receiving out-of-bad data, and having a diagnostic port. The diagnostic port of transceiver 500 is represented by 524A and 524B, wherein 524A represents the diagnostic port input and 524B represents the diagnostic port output. Optical data is received by the transceiver 500 at the ROSA 508 from fiber 506. The optical data may be an incoming double modulated optical signal that includes both high-speed data and out-of-band data. The optical signal is converted to an electronic signal by the ROSA 508. The post amplifier 502 extracts high-speed electronic data which is then fed to the over high-speed output 570 where the high-speed data is made available to the external host 515 in which the transceiver 500 is installed. A decoder 512 extracts out-of-band data from an electronic signal generated by a photodiode current monitor in the ROSA 508 which is then fed into a reception UART 516 in the controller 550. The decoder 512 may also include demodulation functionality when the out-of-band data has been modulated using some modulation technique. The out-of-band data, in this example, is modulated at some low frequency. Low frequency as used in this context does not specify any defined bandwidth other than a bandwidth lower than the high-speed data. The out-of-band data residing in the controller 550 may be transferred to the host device 515 via the I²C port 522 or to an external user device through the diagnostic port output 524B via the port module 580.

The diagnostic port input 524A and the diagnostic port output 524B interface with controller 550 via the port module 580 or the ports 524A and 524B may interface with the controller directly. The port module 580 facilitates the transfer of data between the controller 550 and the diagnostic ports 524A and 524B by providing the necessary conversion components such that the transferred data is in the appropriate format to be properly conveyed, although the controller may also be configured to perform these functions.

In one embodiment, the diagnostic ports 524A and 524B are optical ports which are accessible to the external user device via an optical connection assembly. The optical connection assembly may be a cable having a USB connector on one end for use with the external user device, a laptop in this example, and a second end which forms a clip that fits over the face of the transceiver or other optical transmitter. The clip end of the optical connection assembly that attaches to the face of transceiver may include optical subassemblies positioned to interface with the optical ports on the face of the transceiver. Thereby allowing data to be transferred between the optical port on the face of the transceiver and the external user device.

FIGS. 6A-6E illustrate an exemplary embodiment of a transceiver 600, having a diagnostic port 524 (which may include a diagnostic input 524A and diagnostic port output 524B), optically communicating with an external user device 690. The external user device 690 communicates to the diagnostic communication port 524 of the transceiver 600 via the cable 606 and attached clip connector 603. The clip connector 603 fits over the face of the transceiver 600 and, while the transceiver 600 is operating within the external host 615, engages the diagnostic communication port 524 of the transceiver 600 without disruption of the transfer of high-speed data over fibers 606 and 610.

Figure 6A:
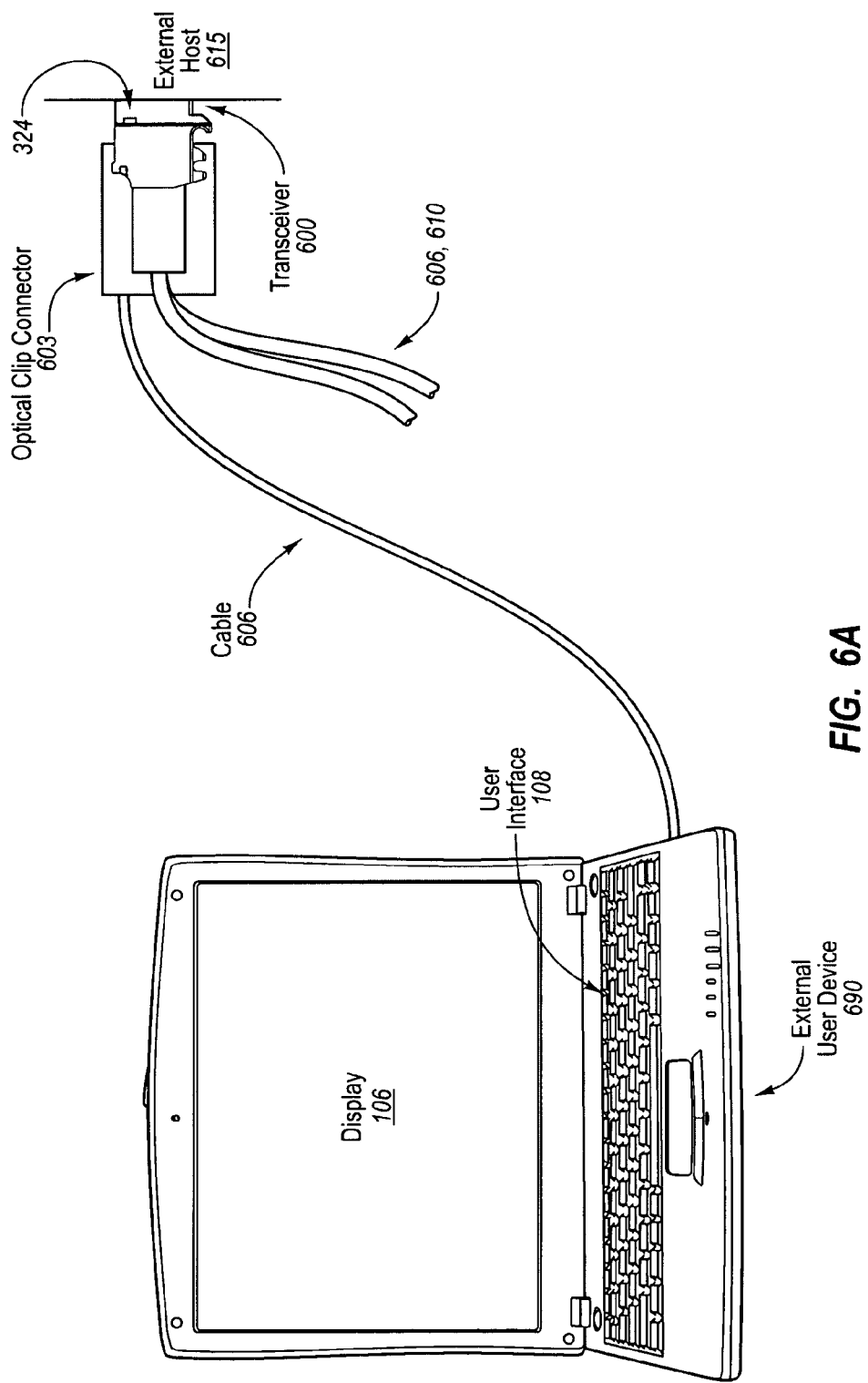
FIG. 6A illustrates an exemplary embodiment of the present invention employing a diagnostic port having an optical transmission format to an external user device via an optical clip connector.
Figure 6B:
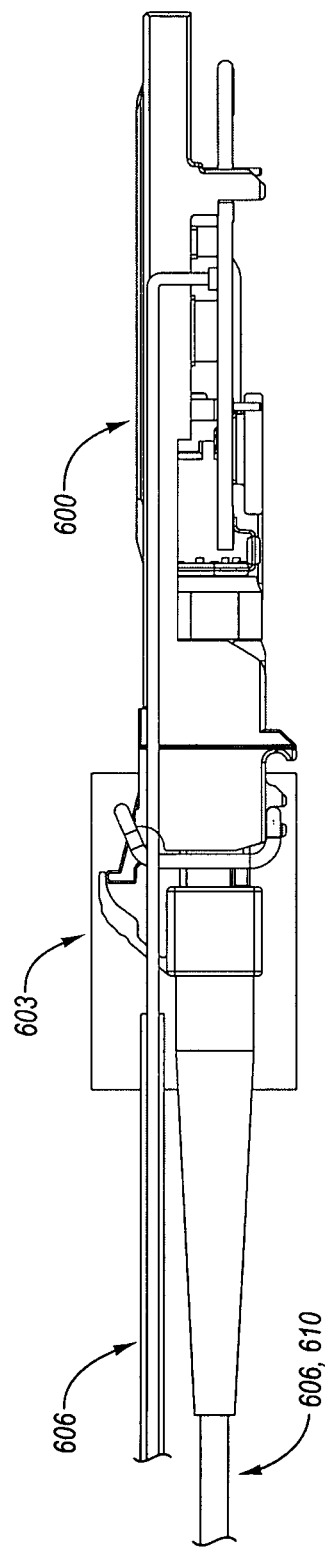
FIG. 6B illustrates a side view of a transceiver module operating within an external host with an optical clip connector attached.
Figure 6C:
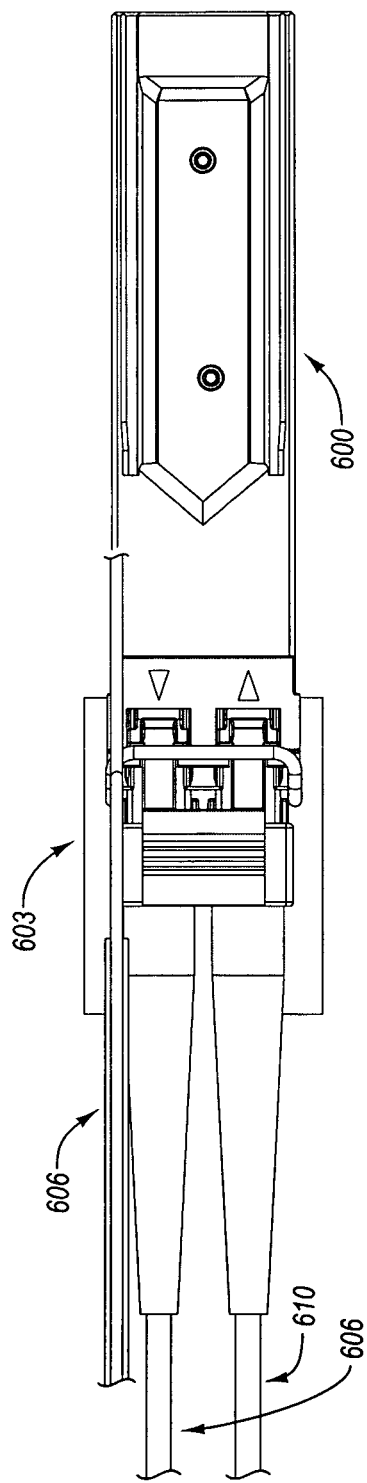
FIG. 6C illustrates a top view of a transceiver module operating within an external host with an optical clip connector attached.
Figure 6D:
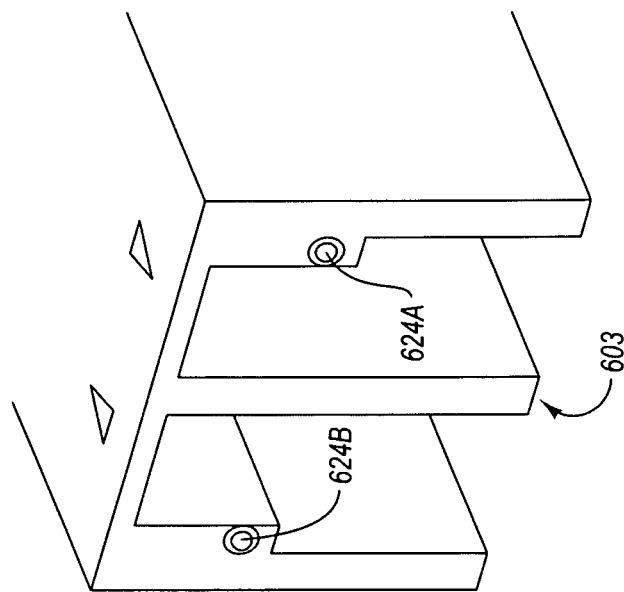
FIG. 6D illustrates an exemplary the face of a transceiver having a diagnostic port and an exemplary face of a optical clip connector.
Figure 6D:
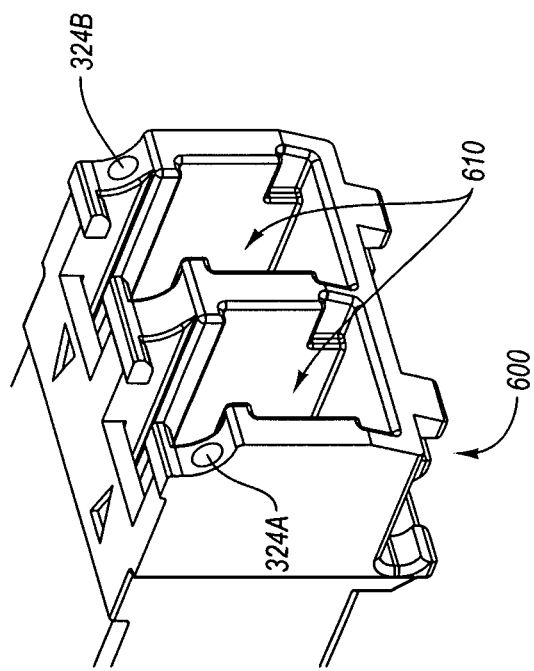
Figure 6E:
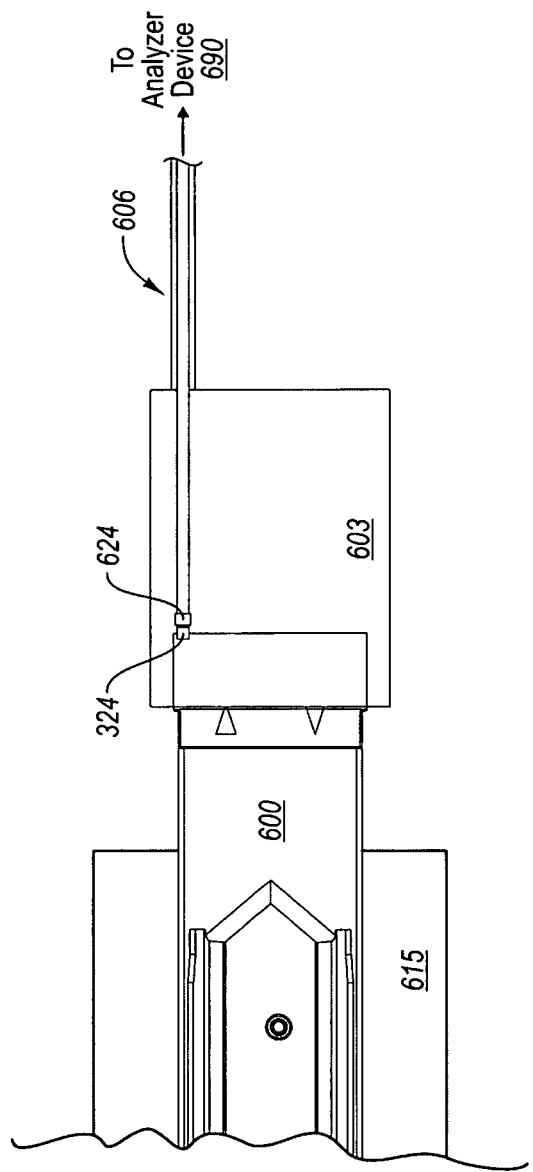
FIG. 6E illustrates the transceiver module operating within an external host with an optical clip connector attached of FIG. 4B in further detail.

As shown in FIG. 6D, the face of the clip connector 603 contains optical ports 624A and 624B that correspond to diagnostic communication ports 524A and 524B, respectively, on the face of the transceiver 600. When attached to the face of the transceiver 600, the optical ports 624A and 624B of the clip connector 603 align with the diagnostic communication ports 524A and 524B of the transceiver 600 such that optical signals may be properly transferred from one port to the other. In this embodiment, diagnostic communication port 524A of the transceiver 600 and optical port 624A of the connector clip 603 are used to transfer data from the external user device 690 to the transceiver 600. An electrical signal generated by the external user device 690 is converted to an optical signal by an electro-optic transducer so that it may be output by optical port 624A and received by diagnostic port 524A of the transceiver 600. Conversely, diagnostic communication port 524B of the transceiver 600 and optical port 640B of the connector clip 603 are used to transfer data from the transceiver 600 to the external user device 690. The optical signal output by the diagnostic communication port 524B is transmitted to optical port 640B and then converted to an electrical signal by an optoelectronic transducer (not shown) such that it may be properly received by the external user device 690. The cable 606 may be either optical or electrical. If the cable 606 is electrical, the optoelectronic transducer and electro-optic transducer may reside in the clip connector 603, and if the cable 603 is optical, the optoelectronic transducer and electro-optic transducer may reside in the external user device 690.

In some instances, the cable length is short, for example less than a meter, less than 5 meters, although longer lengths are within the scope of the invention. In these instances, the relatively short distance can withstand some insertion loss of the light transferred between the diagnostic port 524 and the clip ports 624A and 624B. Further, the lasers and receivers can be relatively inexpensive and designed for data rates that are quite low compared to the data rate of the transceiver itself over the optical fibers 606, and 610.

Alternative methods may be used to transfer data between the external user device 690 and the transceiver 600, including an electrical or wireless transfer. An electrical transfer may involve the use of a connector cable electrically coupled to the external user device 690 and the diagnostic communication port 524 of the transceiver 600. A wireless implementation may include an antenna, transmitter and receiver to wirelessly transfer and receive data. The antenna is a transducer designed to transmit and receive electromagnetic waves. In other words, the antenna converts electromagnetic waves into electrical currents and vice versa. The transmitter works in conjunction with the antenna to propagate the electromagnetic signal. The transmitter may include a number of components including a power supply, an oscillator, a modulator, and amplifiers. The modulator is the component which modulates signal information onto the carrier frequency, which is then broadcast. The receiver receives input from the antenna, uses electronic filters to separate the desired radio signal from undesired signals picked up by antenna, amplifies the desired signal to a level suitable for further processing, and finally converts the signal through demodulation and decoding into a form usable by the processor. Also, a wireless execution may be implemented such that the external user device 690 may interrogate several transceiver modules simultaneously.

FIGS. 6A-6D illustrates the ability of a user to communicate with a transceiver or with a remote transceiver. The device 690, one connected to the diagnostic port 324 of the transceiver, can communicate with the transceiver. This allows the device 690 to view diagnostic data and/or control data without having to disconnect the transceiver or remove the transceiver from the host and without interfering with data being transferred by the transceiver over the fibers 606 and 610. The device 690 can issue queries or instructions to the transceiver 600.

In addition, the device 690 can issue queries or instructions that are received by the transceiver 600 and then transferred to a remote transceiver using the out of band signal. This enables a user of the device 690 to also conduct analysis, queries, upgrades, and the like on remote transceivers in addition to local transceivers.

The cable 606 can be purely optical, purely electrical, or any combination thereof. As a result, the information from output by the diagnostic port 524 may be optical initially, and then converted in the clip 603 or by the device 690, in instances where the device 690 may have an optical port. In another instance, the port 524 may be infrared and a corresponding IR blaster on the device 690 may be all that is needed to communicate with the transceiver 600.

In the transceiver 600, the port module 580 may include an inexpensive laser to generate the light output by the port 524 and a photodiode to receive incoming light. In some embodiments, the data rate can be substantially lower than the data rate of the ROSA and TOSA.

When receiving output from the diagnostic port, the transceiver generates data, which is then converted to optical data and output the port 524. The transceiver may include a light pipe or optical fiber that transfers the optical output of the internal light sources (e.g., laser, led) to the port 524. The clip 603 places the port 624 in close proximity to the port 524. As a result, some of the light in the light pipes that form the port 524 is launched into the fibers or light pipes included in the clip 603. As previously stated, some insertion loss can be tolerated because of the relatively low data rates and because of the short transmission distances. Alternatively, the port 524 and/or the port 624 may be configured with a lens to assist in coupling the light between the port 524 and the port 624. The light received in the port 624 can then be converted to an electrical signal inside the clip 603 or by the device 690. The transmission of data from the device 690 to the transceiver 600 is similar. Light received by a photodiode or other light sensor in the transceiver 600 is converted by the port module 580 and provided to the controller. When the data is intended for a remote transceiver, the controller 550 can then cause the data to be modulated as out of band data that is transmitted to a remote transceiver. A response to the out of band data received from the remote transceiver is then converted to data that is transmitted to the device 690 via the diagnostic port 524.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module comprising:
   an optical transmitter for emitting optical signals representative of electrical signals received from a host onto an optical medium;
   an optical receiver for receiving optical signals from an optical medium and converting the optical signals into electrical signals that can be provided to the host;
   an out-of-band data detector coupled to the optical receiver for extracting out-of-band data from the incoming optical signal, wherein the out-of-band data is at least partially original remote transceiver controller data including original remote transceiver operational parameters and original remote module setup values;
   a processor coupled to the out-of-band data detector, the processor configured to receive the remote transceiver controller data; and
   a diagnostic port assembly coupled to the processor for interfacing with an external user device, wherein the diagnostic port is configured to transmit the original remote transceiver controller data to the external user device and to receive adjusted remote transceiver controller data, including adjusted remote transceiver operational parameters and adjusted remote module setup values, from the external user device for transmission to the remote transceiver.

2. The transceiver module of claim 1, wherein the original or adjusted remote transceiver controller data further includes at least one of remote transceiver digital diagnostic data, remote transceiver operating code, remote transceiver identification information, remote transceiver eye safety and general fault detection information, remote transceiver temperature compensation functions, remote transceiver monitoring functions, remote transceiver power on time data, and remote transceiver margining data.

3. The transceiver module of claim 1, further comprising a demodulator coupled to the out-of-band data detector for demodulating the out-of- band data.

4. The transceiver module of claim 1, wherein the out-of-band data detector is coupled to the optical receiver through a peak detector.

5. The transceiver module of claim 1, wherein the transceiver further comprises:
   a high-speed data modulator coupled to the optical transmitter wherein the optical transmitter is configured to modulate an optical output signal with a high-speed data signal received from the high-speed data modulator;
   an out-of-band data modulator communicatively coupled to the optical transmitter wherein the optical transmitter is configured to modulate the optical output signal in response to the adjusted remote transceiver controller data received from the out-of-band data modulator wherein modulation by the high-speed data modulator and out-of-band data modulator produces an outgoing double modulated signal including high-speed data and remote transceiver controller data.

6. The transceiver module of claim 5, wherein the diagnostic port assembly is an optical assembly and comprises a second optical transmitter and a second optical receiver.

7. The transceiver module of claim 6 wherein, the second optical transmitter assembly is implemented as either a laser or a light emitting diode and the second optical receiver assembly is implemented as either a photodiode or a phototransistor.

8. The transceiver module of claim 5, wherein the diagnostic port assembly is a wireless communication system and comprises an antenna, a transmitter and a receiver.

9. A transceiver module comprising:
   a microcontroller;
   a signal power source communicatively coupled to the microcontroller wherein the signal power source is adapted to produce a physical layer signal for transmission across a physical link;
   a high-speed data modulator communicatively coupled to the signal power source wherein the signal power source is configured to modulate a physical layer signal with a high-speed data signal received from the high-speed data modulator;
   an out-of-band data modulator communicatively coupled to the signal power source wherein the signal power source is configured to modulate the physical layer signal in response to out-of-band data received from the out-of-band data modulator wherein modulation by the high-speed data modulator and out-of-band data modulator produces an outgoing double modulated signal including high-speed data and out-of-band data;
   a diagnostic port assembly communicatively for interfacing with an external user device, wherein the diagnostic port is configured to receive adjusted remote transceiver operating code from the external user device and transfer the adjusted remote transceiver operating code to the microcontroller, wherein the microcontroller is configured to provide the adjusted remote transceiver operating code to the out-of-band data modulator to be modulated as at least some of the out-of-band data.

10. The transceiver module of claim 9, wherein:
    the diagnostic port is further configured to receive remote transceiver data from the external user device and transfer the remote transceiver data to the microcontroller;
    the microcontroller is further configured to provide the remote transceiver data to the out-of-band data modulator to be modulated as at least some of the out-of-band data; and
    the remote transceiver data includes at least one of remote transceiver setup functions, remote transceiver temperature compensation functions, remote transceiver monitoring functions, and request for remote data signals.

11. The transceiver of claim 9, wherein:
the transceiver is an optical transceiver;
the signal power source comprises a laser driver and laser; and
the transceiver further comprises an average power bias circuit configured to control the average power output by the laser, wherein the out-of-band data modulator is coupled to the average power bias circuit.

12. The transceiver of claim 9, wherein:
the transceiver is an optical transceiver;
the signal power source comprises a laser driver and laser; and
the laser driver further comprises an extinction ratio command input configured to control the extinction ratio of a signal output by the laser, wherein the out-of-band data modulator is coupled to the extinction ratio command input.

13. The transceiver of claim 9, wherein:
the transceiver is an optical transceiver;
the signal power source comprises a laser driver and laser;
the transceiver further comprises an average power bias circuit configured to control the average power output by the laser, wherein the out-of-band data modulator is coupled to the average power bias circuit; and
the laser driver further comprises an extinction ratio command input configured to control the extinction ratio of a signal output by the laser, wherein the out-of-band data modulator is coupled to the extinction ratio command input.

14. The transceiver of claim 9, wherein:
the transceiver is an optical transceiver;
the signal power source comprises a laser driver and laser; and
the laser driver further comprises high-speed data 1 level command that defines the power output by the laser when a high-speed data 1 is output, wherein the out-of-band data modulator is coupled to the high-speed data 1 level command.

15. The transceiver of claim 9, wherein the out-of-band modulator is configured to modulate using at least one of phase shift keying, binary phase shift keying, quadrature phase shift keying, and Manchester encoding.

16. The transceiver of claim 9 further comprising:
a signal reception element configured to receive physical layer signals from a physical link and to produce an incoming double modulated signal from the physical layer signal;
an out-of-band detector that is coupled to the signal reception element and is configured to extract out-of-band data from the incoming double modulated signal;
a high-speed data amplifier that is coupled to the signal reception element and is configured to extract high-speed data from the incoming double modulated signal.

17. In a communications environment including a transceiver having a diagnostic port, a method of transmitting data from the diagnostic port of the transceiver on a physical link, comprising:
receiving adjusted remote transceiver content including adjusted remote transceiver operational parameters and adjusted remote module setup values from an external device over the diagnostic port of the transceiver, the diagnostic port used for communicating with the external device separate from the transceiver and the physical link;
converting the received remote transceiver content into out-of-band data;
modulating a data signal with high-speed data;
modulating the data signal with the out-of-band data wherein modulating the data signal with high-speed data and out-of-band data creates an outgoing double modulated signal that is a physical layer signal for transmission on a physical link;
transmitting the double modulated signal onto the physical link.

18. The method of claim 17, wherein modulating the modulated data signal comprises varying at least one of:
the average power of the physical layer signal;
the peak power of the physical layer signal; and
extracting out-of-band data from the incoming double modulated signal; and
transmitting the out-of-band data to the diagnostic port.

19. The method of claim 17, further comprising:
receiving an incoming double modulated signal that includes high-speed and out-of-band data;
extracting high-speed data from the incoming double modulated signal;
the extinction ratio of the physical layer signal.

20. The method of claim 19, wherein extracting out-of-band data from the incoming double modulated signal comprises at least one of:
measuring average power of the incoming double modulated signal;
measuring peak power of the incoming double modulated signal; and
measuring the extinction ratio of the incoming double modulated signal.

* * * * *